March 24, 1925.　　　　　　　　　　　　　　1,530,817
J. F. DUBUS ET AL
MECHANICAL MOVEMENT
Filed Sept. 24, 1924　　　6 Sheets-Sheet 1

March 24, 1925.

J. F. DUBUS ET AL

MECHANICAL MOVEMENT

Filed Sept. 24, 1924

Inventor:
Jules F. Dubus,
Peter A. Dubus,
By Byrnes Townsend & Brickenstein,
Attorneys.

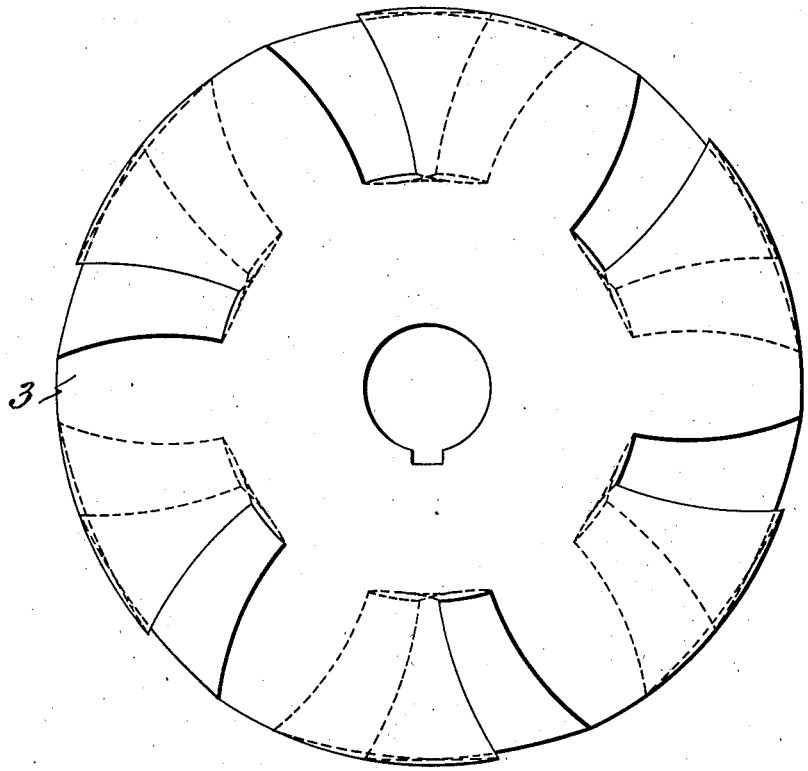
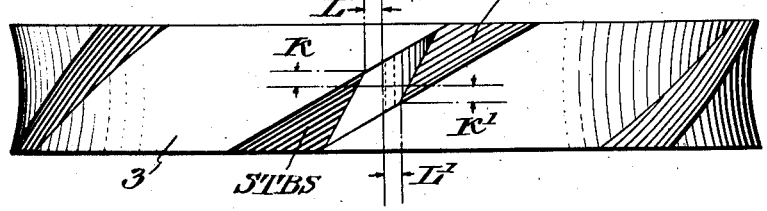

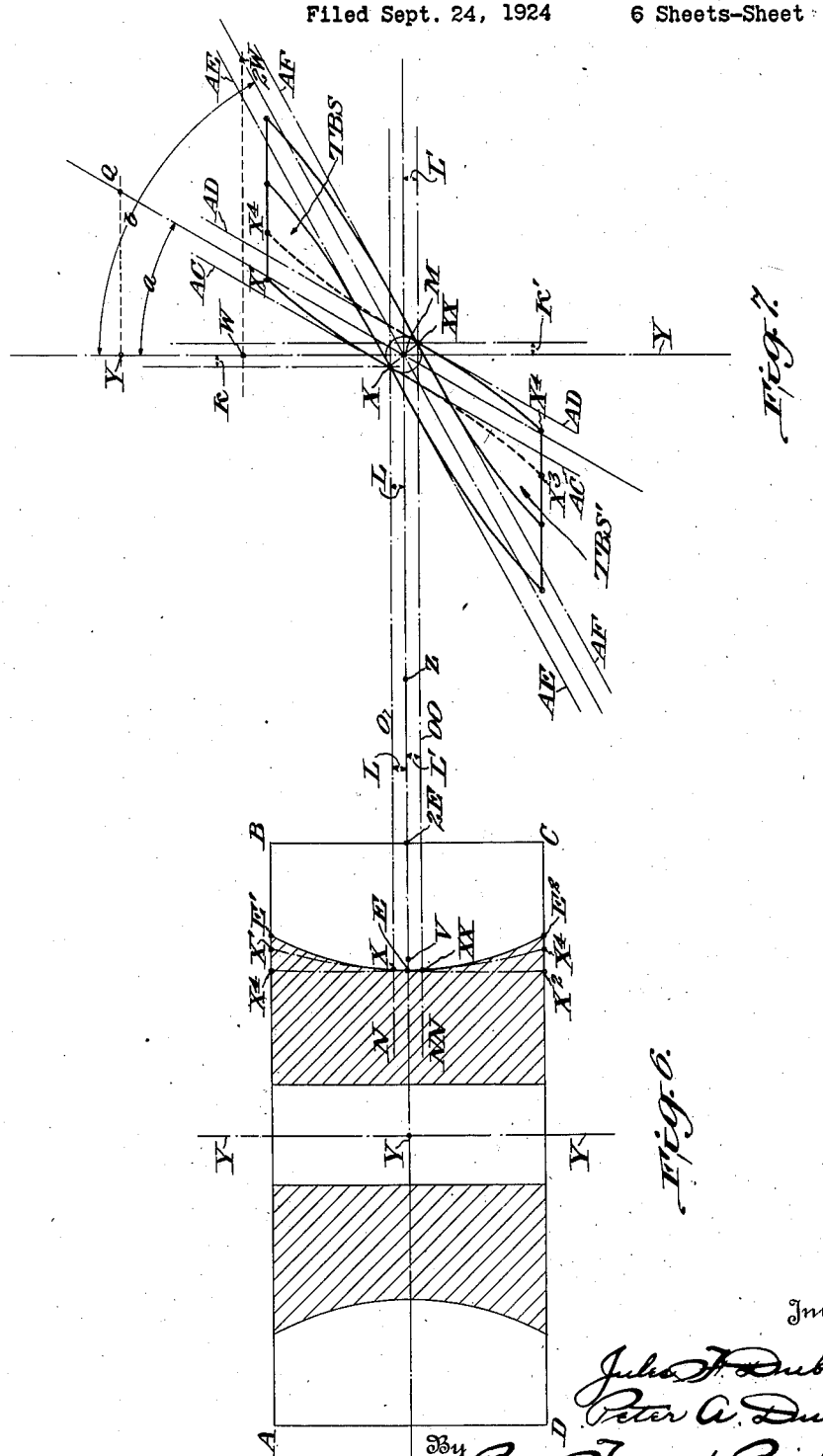

March 24, 1925.   1,530,817
J. F. DUBUS ET AL
MECHANICAL MOVEMENT
Filed Sept. 24, 1924   6 Sheets-Sheet 5
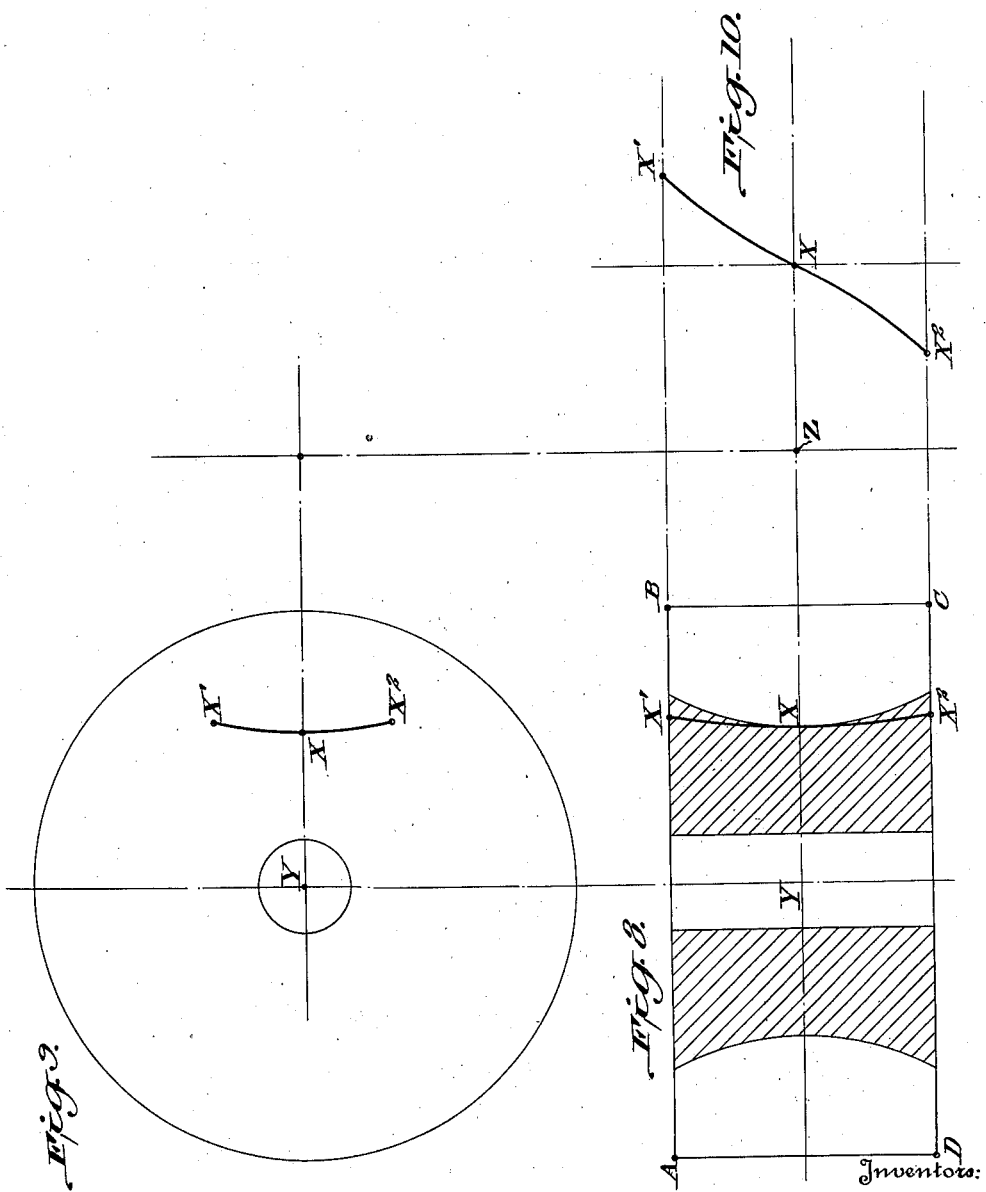

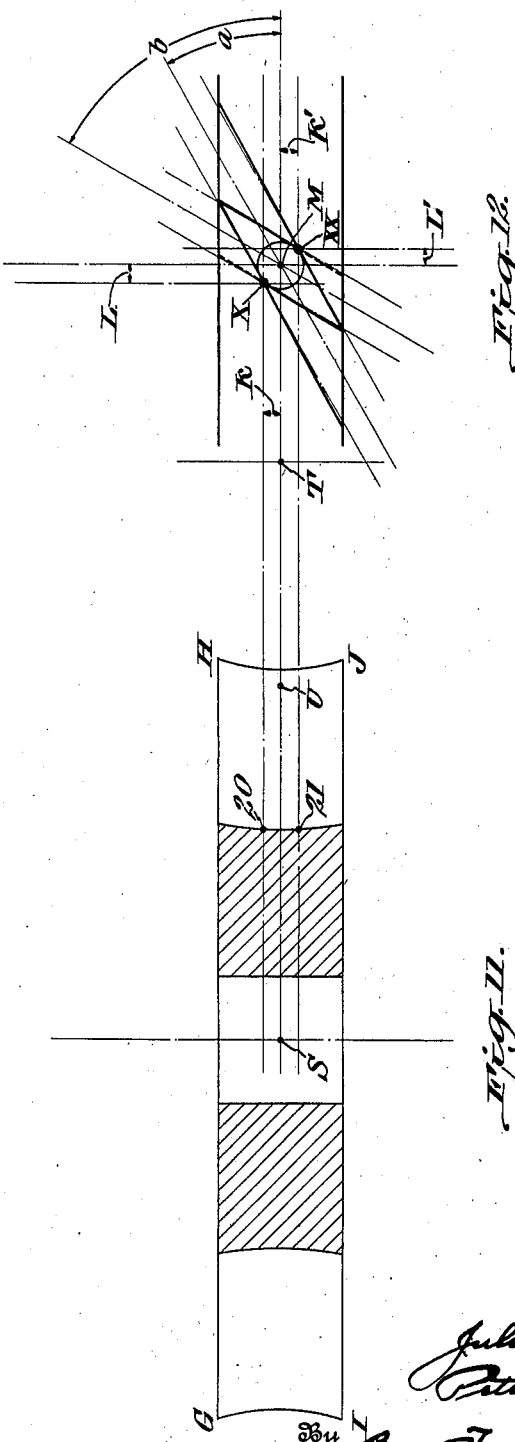

Patented Mar. 24, 1925.

1,530,817

UNITED STATES PATENT OFFICE.

JULES FREDERICK DUBUS AND PETER ARMAND DUBUS, OF NEW ORLEANS, LOUISIANA.

MECHANICAL MOVEMENT.

Application filed September 24, 1924. Serial No. 739,640.

*To all whom it may concern:*

Be it known that we (1) JULES FREDERICK DUBUS and (2) PETER ARMAND DUBUS, citizens of the United States, residing at New Orleans, in the parish of Orleans and State of Louisiana, have invented certain new and useful Improvements in Mechanical Movements, of which the following is a specification.

This invention relates to a mechanical movement and particularly to a mechanical movement comprising intermeshing elements on two shafts arranged at an angle to each other, which intermeshing elements transmit rotary motion from one shaft to the other or permit the rotation of both shafts under some other source of power.

An object of the invention is to provide a mechanical movement in which the intermeshed portions of the elements are maintained in full surface contact with each other as the elements rotate about axes at an angle to each other. More specifically an object is to provide a mechanical movement comprising two rotary elements having intermeshing portions and in which mechanical movement full surface contact is established and maintained at one or both sides of each portion of one element as that particular portion moves into and out of engagement with the cooperating portions of the other element.

These and other objects of the invention may be attained by the embodiments of our invention which are illustrated in the accompanying drawings, in which—

Figs. 4 and 5 are a plan and an elevation, respectively, of the disk member;

Fig. 6 is a diagrammatic view illustrating a graphical solution of fixing the lines of origin which generate the surfaces;

Fig. 7 is a diagram illustrating the shape and manner of generating the curves and surfaces;

Fig. 8 is a section;

Fig. 9 is a plan;

Fig. 10 is a side elevation; (these last three figures showing diagrammatically the shape of the three dimension curve); and Figs. 11 and 12 are diagrams showing the manner in which the corresponding curves are produced on the disk member.

For purposes of illustration we have shown a mechanical movement in which the members rotate at the same angular speed about axes at right angles to each other, and in which the vane or tooth, termed herein "tri-body", generated upon one member is defined by two warped surfaces which are uniformly spaced from each other.

In this specific embodiment, the rotor member 1 is provided with a plurality of vanes or teeth 2 which engage the walls defining slots in the disk member 3. The cooperating surfaces of the members 1 and 3 and warped surfaces, and in practice are produced by causing a cutting tool to rotate about an axis, such as Z in Fig. 6, while the blank which is to be cut, rotates about an axis YY, shown as at right angles to the axis through Z. The cut made by the tool is therefore along a curve having a triple curvature, since it is the resultant of two component circular movements about two axes which are perpendicular to each other. This curve is shown by the projections on three planes in Figs. 8, 9 and 10.

Referring to Fig. 8, if we assume the point X to move in a vertical plane with a uniform angular velocity in the circular path drawn from the center Z and at the same time the disk ABCD (which represents the blank to be cut) to turn around its axis Y also with a uniform angular velocity, the point X will trace a path from X to X' (Fig. 8) and the positions of this point as indicated on the surface planes of projection are shown on Figs. 9 and 10. This resulting path is one half of the complete curve which for convenience may be termed a tri-bend curve. The curved path below the point X is similarly shown on Figs. 8, 9 and 10 as terminating at $X^2$.

The above description represents a special case of tri-bend curve in which the origin X is located on the center line YZ (Fig. 8) but this origin can be located outside of this center line. The general application of this tri-bend curve as applied to the formation of cooperating surfaces is shown on Figs. 2, 6 and 7. In these figures, referring particularly to Figs. 6 and 7, ABCD is the disk blank or rotor, revolving about its axis YY, and the same origin X travels on the circular line E', E, $E^2$, from the center Z. Let the horizontal distance from the origin X to the vertical center line YY be K (Fig. 7), and the vertical distance from the center line YZ be L (Fig. 7). Assume as before the origin X in the vertical plane (Fig. 6) to travel up with a uniform angular velocity on the circular path E—E' and at the same time the disk ABCD to turn around its axis, also with a uniform angular velocity. The origin will accordingly travel from the original point X to the position indicated by X'. The lower part of this curve can be considered as being generated in the same way by moving the origin X down on the line E—E² while the disk is rotating about its axis. The termination of this part of the curve is indicated at X² on Fig. 6.

Figure 2:
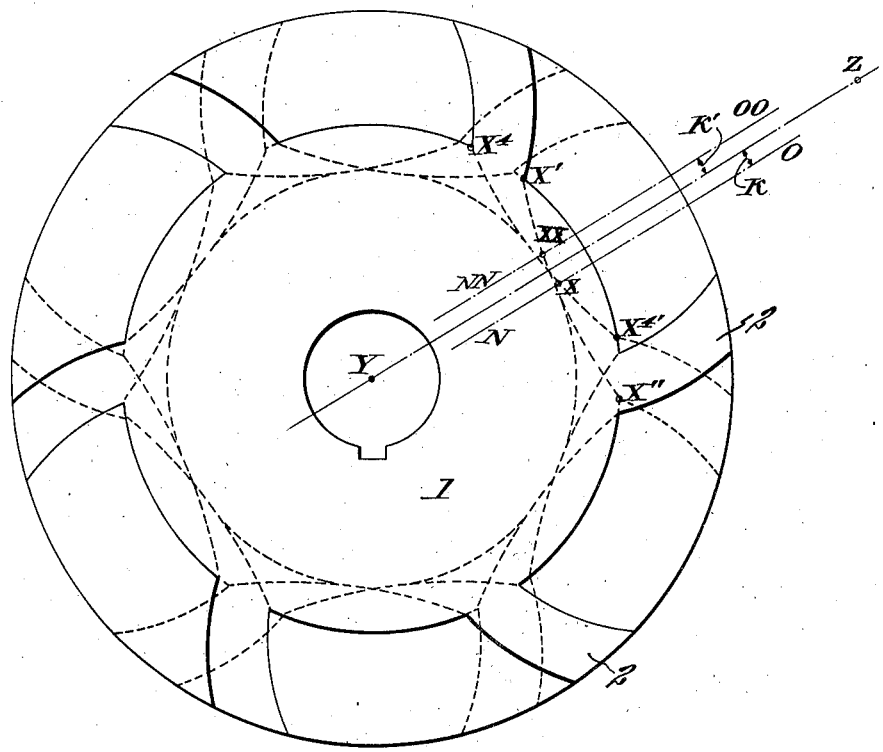
Figs. 2 and 3 are a plan and an elevation, respectively, of the rotor member.

Figs. 2, 6 and 7 show another tri-bend curve which is of the same shape as the curve just described, but which is marked X⁴, XX, X⁴, this curve having been generated from the point XX in a similar manner to the previous curves by making K' equal to K and L' equal to L. Instead of generating these two tri-bend curves with the origins X and XX (Figs. 2, 6 and 7) independently of each other, they might have been generated simultaneously. It will be apparent that if the distances between the origins which generate curves at each instant of generation are kept constant, the two curves will be equidistant throughout their length, and the line X—XX is the line of equidistancy between the curves. Having selected K equal to K' and L equal to L' it is easy to see that the line X—XX is a straight line and passes through the center M.

The number of tri-bend curves generated between the point X and the circumferential surface BC of the disk blank ABCD is unlimited, and therefore it is possible to generate an infinite number of such curves in that space. In case all of the origins of this infinite number of curves are in the same straight (or curved) line and all of these curves are generated from the same axes Y and Z, the surfaces formed by these tri-bend curves will be smooth, continuous, warped surfaces. This surface may be called a tri-bend surface and is marked TBS in Fig. 7.

Similarly between the point XX and the circumferential surface BC it is also possible to generate an infinite number of similar tri-bend curves, and provided that the bases of generation of this surface are equal to the former one, a similar surface will be formed which is marked TBS' (Fig. 7).

These two tri-bend surfaces TBS and TBS' with the two partial end surfaces AB and CD of the disk blank form a solid which may for convenience be termed a tri-body.

Referring to the description of the equidistancy, above referred to, of the tri-bend curves, it is of great importance to note that not only the two curves X', X, X² and X⁴, XX, X⁴, are equidistant, but that all of the pairs of tri-bend curves spaced at equal radial distances from the axis Z are equidistant from each other.

Figure 3:
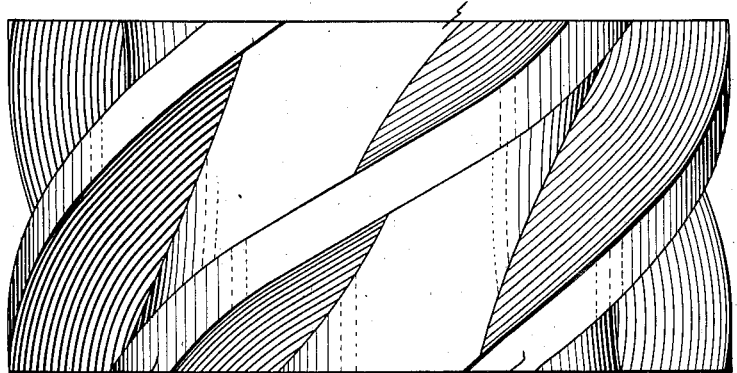

In the particular instance shown in which the distance K is equal to K' and the distance L is equal to L', and in which the imaginary lines of the origins X and XX form straight lines and are parallel to the center line YZ (Fig. 6) there is produced a tri-body on which all the lines of equidistancy are of equal length, or in other words, there is produced a tri-body of uniform thickness. There are six such tri-bodies shaped on the disk ABCD as shown in Figs. 2 and 3.

Figure 1:
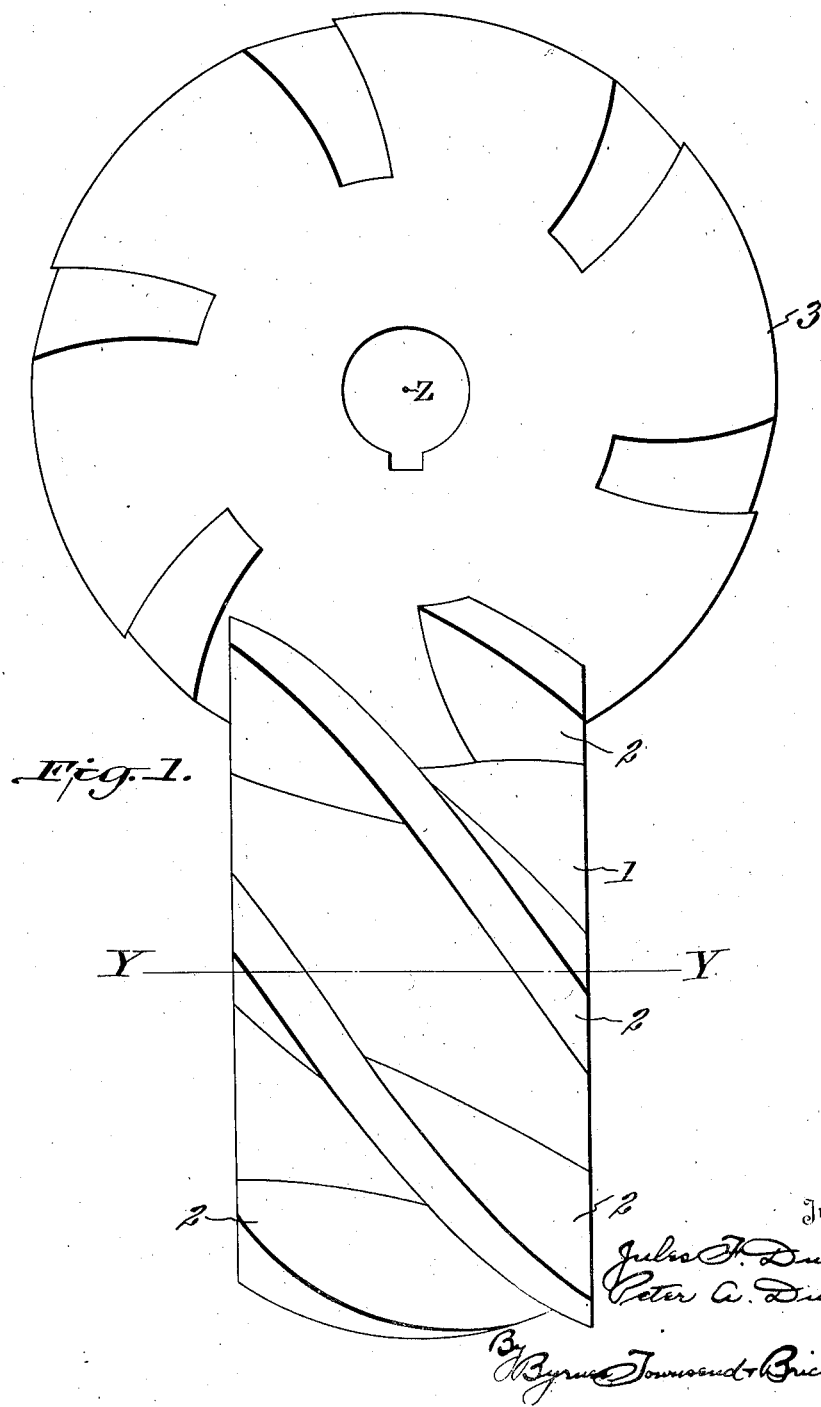
Fig. 1 is an elevation of a pair of intermeshed members.

All that was said in the previous analysis in regard to the generation of the tri-bend curves on the rotor, applies also to the curves shown in Figs. 11 and 12 for the cooperating member 3, shown in Figs. 1, 4 and 5.

If the walls of the slots in this member 3 are to engage the walls of the tri-body tooth or vane, it is apparent that the cutting tool must be offset by amounts numerically equal to the distances K, L, and K', L', as determined in Fig. 7. It is to be noted, however, that the axes of the members 1 and 3 are at an angle of 90° to each other. As will be understood from Figs. 1 and 7, the vertical and horizontal offsets K and L, respectively, which are given to the tool when cutting the toothed surface of a rotor member will be reversed when setting the tool to cut the slotted wall which is to engage that surface. The offsets K, L, K', and L', which must be used in cutting the slot walls which will engage the walls of the tooth shown in the Fig. 6, are indicated in Fig. 12, and the center distances must be the same. The center distances, ST, of Fig. 11 are the same as YZ of Fig. 6.

Now if the point U in Fig. 11 is the point which comes into mesh with the point V in Fig. 6, the tri-bend curve passing through the point V is identical with the tri-bend curve passing through the point U, that is, the curvature of the curve on the rotor coincides throughout its length with the curvature of the curve on the cooperating member. Not only do these two curves coincide, but all other similar curves must coincide, so that the surfaces generated by these curves on the two cooperating members will also coincide. This will be readily apparent from the following considerations. In the cooperating member or disk GHIJ (Fig. 11) between the point 20 and the circumferential surface HJ can also, as in the previous case, exist an infinite number of tri-bend curves. Provided the bases of all these infinite number of curves are the same, it is evident these curves will also form a tri-bend surface. A similar set of curves will form a surface between 21 and HJ. These two surfaces STBS and STBS' (Fig. 5) form a slot in the disk member GHIJ (Fig. 11) which may, for convenience, be called a tri-slit. There are six tri-slits shown in Fig 4 of the drawing.

All that has been said about the generation of the toothed members will apply equally well to the generation of the walls of the cooperating or tri-slit member. Each tri-bend curve on the one member will cooperate with some corresponding tri-bend curve on the wall of the other member and there will thus be formed mating surfaces lying on each other without any clearance between them, provided of course that the center distances YZ and ST are left unchanged.

While the cooperating members have been described as having each two surfaces in engagement, obviously only one pair of cooperating surfaces is needed, if the rotation is to take place only in one direction.

The location of the generating lines OX and OO—XX is not arbitrary, but must be determined for a given arrangement of shafts or axes of rotation, the ratio of angular velocity of the shafts, the thickness of the vane or tooth and the length or relative location of the vane or tooth portion.

The graphical solution of the problem of locating the generating line OX for this particular case is as follows:

Extend the line YZ and at any given point M erect a normal YY (Fig. 7). Lay off angles "$a$" and "$b$". The length of the tooth, that is the distance between E and 2E is selected. With M as a center and a radius equal to ½ of the thickness of the tri-body, describe a circle, shown in Fig. 7. Construct the angle YMQ which is designated as the angle "$a$". This is the instantaneous angle made by the origin M with the vertical axis YY at the point E (Fig. 6) at the instant the origin M passes through the point E. In general the angle "$a$" equals:

$$\text{Tangent } "a" = \frac{\text{angular velocity of the point E around Y}}{\text{angular velocity of the point E around Z}},$$

or in our case on account of the ratio of angular velocities being 1 to 1;

$$\text{Tangent } "a" = \frac{\text{circumferential velocity of the point E around Y}}{\text{circumferential velocity of the point E around Z}},$$

or more simply it can be expressed by $$\text{Tangent } "a" = \frac{Y,E}{Z,E}$$

Graphical construction of this angle "$a$" is as follows: Make M, Y equal to E, Z and through the point Y draw a line parallel to Z, M. Make Y, Q equal to Y, E and connect Q with M.

Construct angle W,M,2W = angle "$b$" (Fig. 8). This is the instantaneous angle made by the origin M with the vertical axis Y,Y at the point 2E (Fig. 6) at the instant the origin M passes through the point 2E. In general the angle "$b$" equals:

$$\text{Tangent } "b" = \frac{\text{angular velocity of the point 2E around Y}}{\text{angular velocity of the point 2E around Z}},$$

or in our case on account of the ratio of angular velocity being 1 to 1;

$$\text{Tangent } "b" = \frac{\text{circumferential velocity of the point 2E around Y}}{\text{circumferential velocity of the point 2E around Z}},$$

or simply:

$$\text{Tangent } "b" = \frac{Y,2E}{2E,Z}$$

Graphical construction of angle "$b$". Make M,W = 2E,Z and through the point W draw a line parallel to Z,M. Make W,2W equal to Y,2E and connect 2W and M.

To determine the lines of origin for a tri-body of uniform thickness, as in this case, these lines are straight and their location is found as follows:

Draw the line AC,AC tangent to circle Fig. 7 and parallel to the line MQ.

Draw the line AE AE tangent to the same circle Fig. 7 and parallel to M,2W.

The intersection of the line AC,AC with the line AE, AE is the point X, which is the end view of the line of all the infinite number of origins passing between the point X, and the curved surface BC of the disk ABCD, Fig. 6.

Draw the line AD,AD tangent to the circle AB, Fig. 8, and parallel to the line M, Q.

Draw the line AF, AF tangent to the circle AB and parallel to the line M,2W.

The intersection of the line AD,AD with the line AF, AF is the point XX.

Above the center line Y,Z (Fig. 6) in a distance equal to L draw the line N, O, parallel to Y, Z. This is the vertical projection of the imaginary line of the origins passing through point X, Fig. 7.

In the Fig. 2 below the center line Y,Z and in a distance equal to K draw the line N, O parallel to Y,Z. This is the horizontal projection of the imaginary line of the origins passing through point X, Fig. 7.

The line OO—NN in Figs. 2 and 6 is constructed in the same way as the line O—N just mentioned.

In constructing the toothed member such as the member 1, the several points corresponding to the point M will be located upon the circumference of the blank in accordance with the number of teeth to be cut. From this point the points X and XX are located. Assuming that a tool is mounted to rotate in a vertical plane about the horizontal axis Z, the cutting edge of the tool is adjusted upwardly a distance equal to L and laterally a distance equal to K. Upon simultaneous rotation of the tool about its axis and the blank about its axis, these axes being at an angle to each other, the cutting point of the tool as it is gradually advanced along the line OX or OOXX, will form a surface of the kind described.

The second member of the mechanical movement, that is the disk member 3, may be cut upon the same machine as the rotor member 1. As the walls of the slots in the disk member 3 are to engage the walls of the tooth or vane 2, it is apparent that the cutting tool must be offset by amounts numerically equal to the distances K, K' and L, L', as indicated in Fig. 12.

The complementary surfaces cut on the wall of the tooth and the wall of the slit will thus, when intermeshed, have full surface contact for the extent of their mutual engagement.

These tri-bend surfaces are therefore "ruled surfaces", and more specifically warped surfaces, generated by a line common to each member, moving in constantly changing position as the members rotate about their angularly located axes.

In other words, each front and back surface of a tooth, such as 2 (Fig. 1) may be considered as generated by a line moving in the manner described, and as these generating lines are parallel, the distance between the two surfaces is always the same.

Therefore the surfaces on each side of the teeth 2, will engage over their entire engaging surface with the corresponding surfaces constituting the walls of the slits in the member 3.

It is obvious that the number of vanes or teeth and slots on the engaging members may be varied in accordance with the particular use for which the mechanical movement is designed.

While we have illustrated but one specific embodiment of our mechanical movement, it will be understood that various changes may be made without departing from the spirit of our invention.

Certain modifications have been indicated above, and further modifications in the specific construction may arise in accordance with the choice of the following variables:
1. Spacing and angular relation of shafts;
2. Overall dimensions of the intermeshed members;
3. Ratio of angular velocities of the members;
4. Shape, thickness and number of intermeshing projections.

It is therefore apparent that mechanical movement falling within the scope of the invention may take innumerable specific forms in accordance with the particular use for which the movement is designed.

The machine tool by which these surfaces may be cut is described in an application Serial No. 739,641, filed concurrently herewith.

We claim:

1. A mechanical movement comprising two bodies adapted to rotate about axes which are arranged at an angle to each other and are spaced apart by a distance greater than the radius of either body, said bodies having intermeshing portions in surface contact with each other.

2. A mechanical movement as claimed in claim 1 wherein the surfaces of said intermeshing portions are warped surfaces.

3. A mechanical movement as claimed in claim 1 wherein the two warped surfaces defining an intermeshing portion on either of said members are uniformly spaced from each other, substantially as described.

4. A mechanical movement as claimed in claim 1, in which engaging surfaces of the intermeshing portions are identical ruled surfaces.

5. A mechanical movement comprising two bodies adapted to rotate about axes arranged at an angle to each other, said bodies having intermeshing portions in surface contact with each other, the engaging surfaces of the intermeshing portions being identical ruled surfaces, said surfaces having a conformation due to elements of triple curvature whose curvature is that of the path of movement of a point resultant from component motions of rotation about two axes at an angle to each other, substantially as shown and described.

In testimony whereof, we affix our signatures.

JULES FREDERICK DUBUS.
PETER ARMAND DUBUS.